United States Patent [19]

Ganev

[11] Patent Number: 4,997,254
[45] Date of Patent: Mar. 5, 1991

[54] OPTICAL FIBER COUPLER HAVING ABUTTING CONCAVE AND CONVEX SURFACES

[75] Inventor: Tsviatko S. Ganev, Uppsala, Sweden

[73] Assignee: Telefonaktiebolaget L M Ericsson, Stockholm, Sweden

[21] Appl. No.: 501,773

[22] Filed: Mar. 30, 1990

[30] Foreign Application Priority Data

Apr. 25, 1989 [SE] Sweden ............................... 8901502

[51] Int. Cl.$^5$ ......................... G02B 6/32; G02B 6/26; G02B 6/36
[52] U.S. Cl. ............................... 350/96.20; 350/96.18
[58] Field of Search ............... 350/96.15, 96.18, 96.20, 350/96.21

[56] References Cited

U.S. PATENT DOCUMENTS

| 4,658,130 | 4/1987 | Durbin | 250/227 |
| 4,707,067 | 11/1987 | Haberland et al. | 350/96.20 |
| 4,884,861 | 12/1989 | Nodfelt | 350/96.18 |

FOREIGN PATENT DOCUMENTS

| 2634370 | 2/1977 | Fed. Rep. of Germany . |
| 2918024 | 11/1980 | Fed. Rep. of Germany . |
| 0134712 | 6/1986 | Japan . |
| 0240209 | 10/1986 | Japan . |
| 1483878 | 7/1977 | United Kingdom . |
| 1508138 | 4/1978 | United Kingdom . |

Primary Examiner—Akm Ullah
Attorney, Agent, or Firm—Burns, Doane, Swecker & Mathis

[57] ABSTRACT

The present invention relates to a contact device intended for obtaining optical connection between an opto-component (1) and an optical fiber (2). The contact device includes a first contact-part (3) in which the opto-component is fixedly mounted, and a second contact-part (4) in which the optical fiber is fixedly mounted. The contact-parts (3, 4) present mutually opposing openings (8, 15) which extend respectively from the opto-component (1) and the fiber (2), and the contact-parts are secured together in a manner to obtain the best light-transmission properties. The contact-parts (3, 4) have mutually abutting and mutually complementary spherical surfaces (9, 19), which enable the contact-parts to be rotated relative to one another about their center axes and also to be angled in relation to one another. The openings (8, 15) dissect spherical segments in the abutment surfaces (5) of the contact-parts.

6 Claims, 2 Drawing Sheets

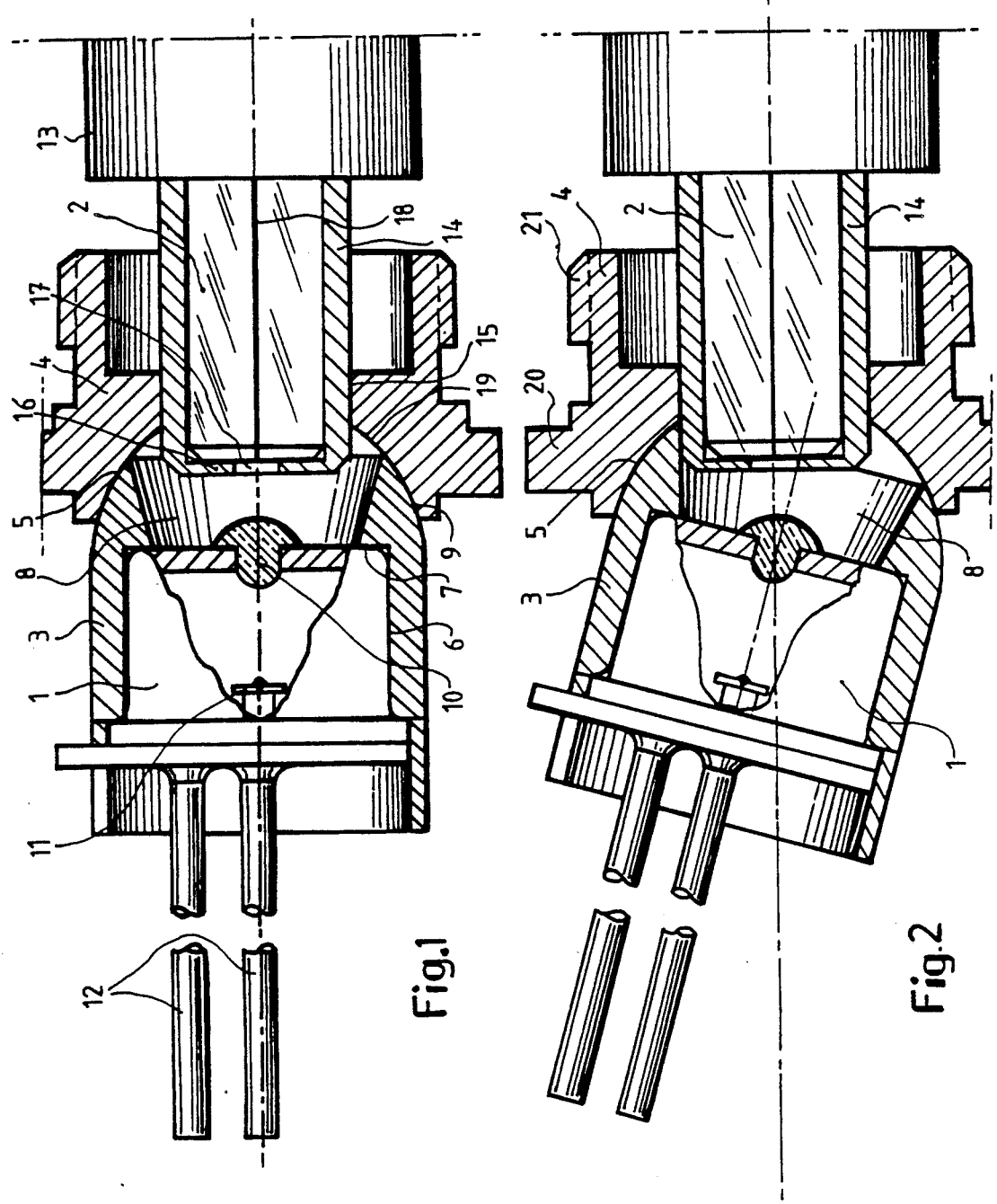

OPTICAL FIBER COUPLER HAVING ABUTTING CONCAVE AND CONVEX SURFACES

FIELD OF THE INVENTION

The present invention relates to a contact device for establishing an optical coupling between an opto-component and an optical fibre, said device comprising a first contact-part in which the opto-component is fixedly mounted, and a second contact-part in which the optical fibre is fixedly mounted, and in which device the contact-parts present mutually opposing openings which extend from the opto-component and the fibre respectively and which are fastened together in a position in which optimum light-transmission properties are obtained.

BACKGROUND OF THE INVENTION

Contact devices for obtaining an optical coupling between an opto-component and an optical fibre are known to the art. Such contact devices include a first contact-part in which the opto-component is fixedly mounted, and a second contact-part in which the optical fibre is fixedly mounted. The contact-parts present mutually opposing openings which extend from the opto-component and the fibre respectively, and mutually abutting flat surfaces. The opto-component and the fibre are mutually aligned for optimum light-transmission properties, by displacing the contact-parts relative to one another, whereafter the contact-parts are either glued or welded together in this position.

Known contact devices of this kind are encumbered with several drawbacks. One drawback lies in the difficulty of maintaining correct alignment between the contact-parts when securing the parts together, due to the fact that the contact-parts are able to move readily along the flat abutment surfaces Furthermore, it is impossible to angle the contact-parts in relation to one another for the purpose of compensating for any error of alignment of the opto-component or the fibre in respective contact-parts in relation to the centre axis.

SUMMARY AND OBJECTS

The object of the present invention is to avoid the drawbacks associated with known contact devices, by providing a contact device in which the contact-parts can be angled in relation to one another and in which the true alignment of the contact parts can be readily maintained while securing the parts together. This object is achieved by giving the abutment surfaces of the contact-parts a spherical configuration in accordance with the disclosures made in the following Claims.

Several advantages are afforded by a contact device configured in accordance with the invention.

One advantage is that the contact-parts can be rotated, twisted, and angled in relation to one another. This enables any alignment error relating to the opto-component and/or the optical fibre mounted in respective contact-parts to be readily rectified so that optimum light-transmission properties between the opto-component and the optical fibre can be achieved.

Another advantage is that the contact-parts can be readily held in true alignment while securing the parts together, by virtue of the part-spherical configuration of the abutment surfaces, which makes it difficult to displace the contact-parts relative to one another.

Further advantages afforded by a contact device configured in accordance with the present invention will be evident from the following description of preferred embodiments, made with reference to the accompanying drawings.

BRIEF DESCRIPTION OF THE DRAWINGS

FIG. 1 is a sectional view of a preferred embodiment of an inventive contact device.

FIG. 2 illustrates schematically the manner in which the contact device shown in FIG. 1 can be aligned.

DETAILED DESCRIPTION OF THE PREFERRED EMBODIMENTS OF THE INVENTION

Figure 3:
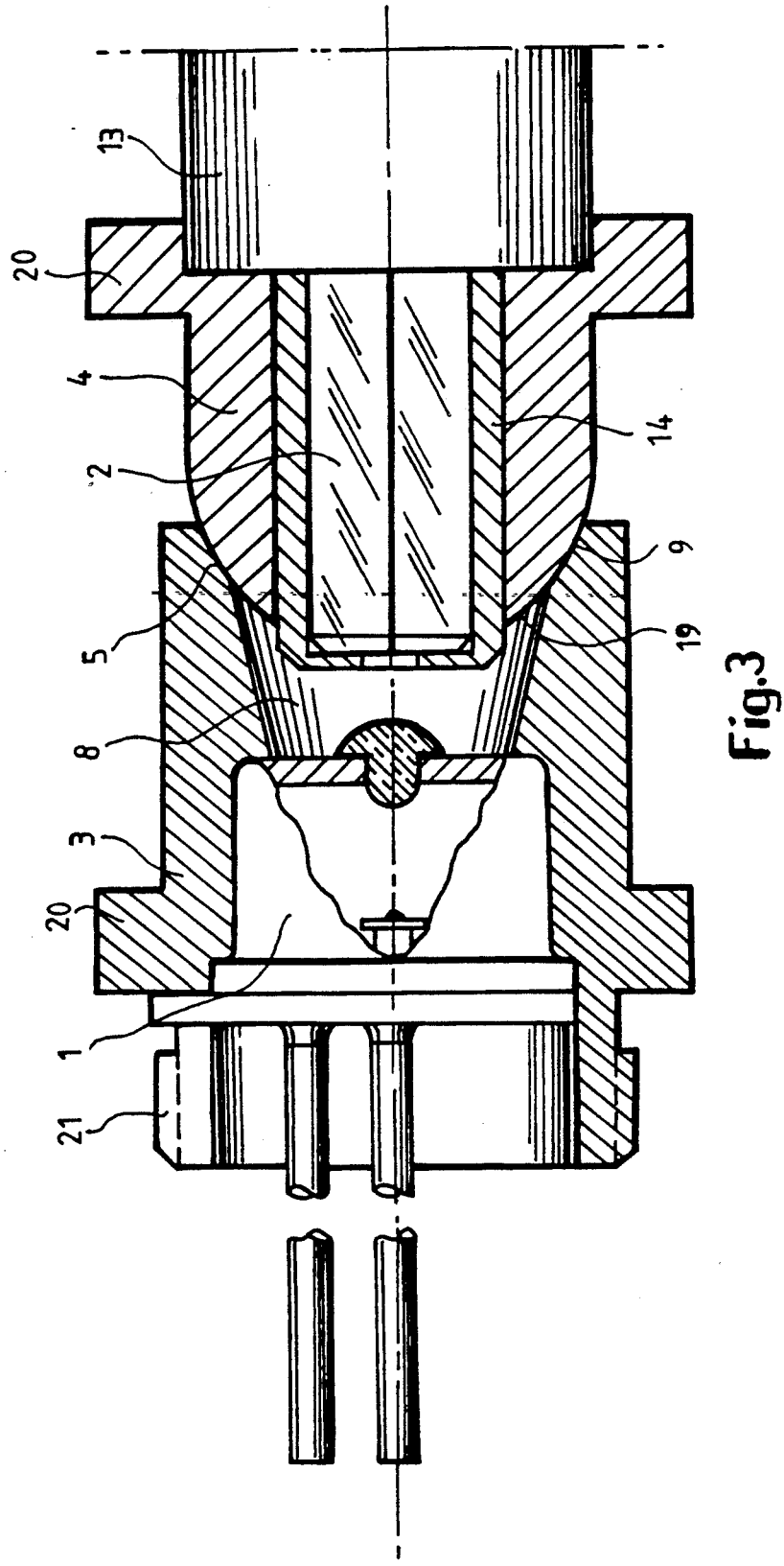
FIG. 3 illustrates an alternative embodiment of an inventive contact device.

FIG. 1 is a sectional view of a contact device configured in accordance with the invention. The contact device is intended to provide an optical coupling between an opto-component 1 and an optical fibre 2 in a manner to obtain the best possible light-transmission properties. The opto-component 1, which may be an optical transmitter, such as a laser diode, or an optical receiver, such as a PIN-diode, is fixedly mounted to a first contact-part 3, and the optical fibre 2 is fixedly mounted to a second contact-part 4. In order to enable optimum light-transmission properties to be obtained, the contact-parts 3 and 4 can be adjusted in relation to one another along a common abutment surface 5, as explained in more detail herebelow.

The opto-component 1 is inserted in a bore 6 and rests against a shoulder surface 7 on the first contact-part 3. An opening 8 extends from the opto-component, through the contact-part 3 and up to the abutment surface 5. In accordance with the invention, the abutment surface 5 has the form of a convex, spherical surface and the opening 8 disects a spherical segment in the centre of said surface and the remaining, actual abutment surface on the contact-part 3 constitutes a part-spherical zone 9. The shoulder surface on the contact-part 3 is spaced from the abutment surface 5, such that a lens 10 included in the opto-component 1 will lie on the centre point of the spherical surface. This opto-transmitting or opto-receiving unit is referenced 11 in the drawing while the connecting pins belonging thereto are referenced 12. The opto-component 1 is fixedly mounted in the contact-part 3 in some suitable manner, for example by means of an adhesive.

The sheathing 13 of the optical fibre 2 has been removed from the outermost or distal end of said fibre and this bare fibre-end is inserted into a sleeve 14 and clamped securely therein, for instance, and the sleeve is, in turn, inserted into a bore or opening 15 provided in the second contact-part 4. The optical fibre 2 is inserted into the sleeve 14 so as to abut an end-wall 16 in the sleeve. A hole 17 is provided in the end-wall, opposite the core 18 of the optical fibre. The bore 15 extends through the contact-part 4 and opens into the abutment surface 5, which consists in a concave, part-spherical surface complementary to the convex part-spherical surface on the contact part 3. The opening 15 disects a part-spherical segment in the centre of this surface, whereby the remaining, actual abutment surface on the contact-part 4 constitutes a part-spherical zone 19. The sleeve 14, and thus also the optical fibre 2, is fixedly mounted in the contact-part 4 in some suitable manner, for instance, by means of an adhesive, such that the sleeve will project slightly beyond the abutment surface 5 and into the opening 8 in the contact-part 3, where the contact-parts 3 and 4 are secured together.

Because of manufacturing faults and other faults, it is difficult to align the opto-component 1 and the optical fibre 2 precisely along the respective centre axes of the contact-parts 3 and 4 and to fixate said opto-component and said optical fibre precisely in the centre of said axis. In order to obtain optimum light-transmission properties in spite of this difficulty, the contact-parts can be displaced relative to one another along the common abutment surface 5, as illustrated schematically in FIG. 2. This Figure illustrates how the contact-parts 3 and 4 can be angled relative to one another, this angular displacement being limited by projection of the sleeve 14 provided in the contact-part 4 into the opening 8 in the contact-part 3. In addition to the illustrated angular displacement, the contact-parts 3 and 4 can also be rotated relative to one another about their respective centre axis. Because of these adjustment possibilities, the contact-parts can be mutually adjusted so as to achieve the best possible light-transmission properties. Subsequent to adjusting the position of the contact-parts, said parts are secured to one another by gluing, welding or in some other appropriate manner.

FIG. 3 illustrates an alternative embodiment of the inventive contact device. In this embodiment, the first contact-part 3, which contains the opto-component 1, is configured with a concave, spherical abutment surface 5 which is formed by a part-spherical zone 9, whereas the second contact-part 4, which contains the optical fibre 2, is configured with a convex, part-spherical abutment surface 5, formed by a part-spherical zone 19. The remainder of this embodiment of the inventive device coincides with the embodiment above described with reference to FIG. 1 and possesses the same possibilities of adjusting the positions of the contact-parts 3 and 4 in relation to one another, as illustrated schematically in FIG. 2. Similar to the earlier embodiment, angular displacement is restricted by projection of the sleeve 14 into the opening 8.

In order to enable the contact device to be mounted securely in the equipment for which it is intended, one or possibly both contact-parts 3 or 4 are provided with an attachment flange 20 and/or a screw threaded part 21, as illustrated schematically in the Figures. The illustrated embodiments of these fastener devices, however, shall merely be seen as an example and it will be understood that the invention is not restricted to precisely the illustrated fastener embodiments.

It will be understood that the invention is not restricted to the described and illustrated embodiments thereof and that modifications can be made within the scope of the following Claims.

I claim:

1. A contact device for providing an optical coupling between an optical component and an optical fiber, comprising:
    a first contact-part in which said optical component is fixedly mounted;
    a second contact-part in which said optical fiber is fixedly mounted;
    said contact-parts presenting mutually opposing openings which extend respectively from said optical component and said fiber and being secured together in a position to obtain optimum light-transmission properties;
    said contact-parts having mutually abutting and mutually complementary part-spherical surfaces allowing said contact-parts to be rotated relatively around their center axes and angled in relation to one another;
    said openings dissecting spherical segments in said abutting surfaces of the contact-parts and thereby creating segment-shaped openings;
    said optical component including a lens arranged centrally of said segment-shaped opening of said first contact-part and arranged on a center point of said spherical surface of said first contact-part, said first contact-part having a convex spherical abutment surface and said second contact-part having a concave spherical abutment surface;
    wherein said optical fiber opens in the center of said segment-shaped opening of said second contact-part and is disposed in a sleeve which projects beyond an imaginary outer abutment surface of said segment-shaped opening of said second contact-part to thereby limit relative displacement of said first and second contact-parts.

2. The contact device according to claim 1, wherein a portion of said sleeve that projects beyond said imaginary outer abutment surface limits angled displacement of said first contact-part.

3. The contact device according to claim 1, wherein a portion of said sleeve that projects beyond said imaginary outer abutment surface limits angled displacement of said second contact-part.

4. A contact device according to claim 1, wherein said lens included in said optical component being arranged centrally of said segment-shaped opening of said first component part, and said optical fiber being positioned to open in the center of said segment-shaped opening of said second contact-part.

5. A contact device for providing an optical coupling between an optical component and an optical fiber, comprising: a first contact-part in which said optical component is fixedly mounted; a second contact-part in which said optical fiber is fixedly mounted; said contact-parts presenting mutually opposing openings which extend respectively from said optical component and said fiber and being secured together in a position to obtain optimum light-transmission properties; said contact-parts having mutually abutting and mutually complementary part-spherical surfaces allowing said contact-parts to be rotated relatively around their center axes and angled in relation to one another; said openings dissecting spherical segments in said abutting surfaces of the contact-parts and thereby creating segment openings; said optical component including a lens arranged centrally of said segment-shaped opening of said first contact-part and arranged on a center point of said spherical surface of said first contact-part, said first contact-part having a concave spherical abutment surface and said second contact-part having a convex spherical abutment surface;
    wherein said optical fiber opens in the center of said segment-shaped opening of said second contact-part and is disposed in a sleeve which projects beyond an imaginary outer abutment surface of said segment-shaped opening of said second contact-part to thereby limit relative displacement of said first and second contact-parts.

6. A contact device according to claim 5, wherein said lens included in said optical component being arranged centrally of said segment-shaped opening of said first component part, and said optical fiber being positioned to open in the center of said segment-shaped opening of said second-part.

* * * * *